May 27, 1952     A. YUNG ET AL     2,598,090
MOISTUREPROOF PROTECTIVE MEMBRANE MATERIAL
AND METHOD OF MAKING SAME
Filed Jan. 31, 1950
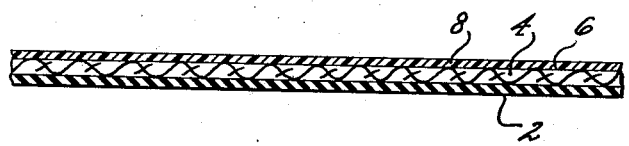
FIG. I.
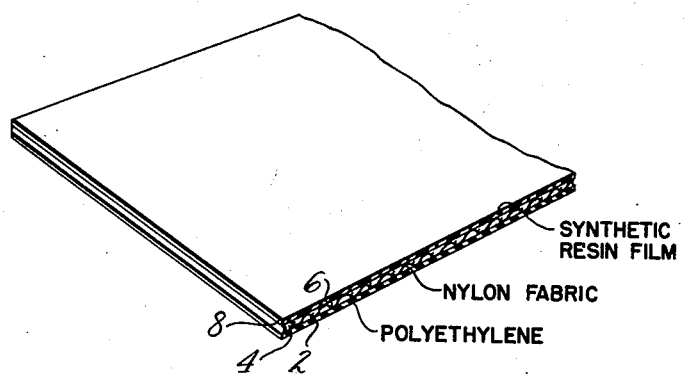
FIG. 2.
Inventor
Ashun Yung &
William P. Lowden
Attorney Patented May 27, 1952

2,598,090

UNITED STATES PATENT OFFICE 2,598,090

MOISTUREPROOF PROTECTIVE MEMBRANE MATERIAL AND METHOD OF MAKING SAME

Ashun Yung, Merchantville, and William P. Lowden, Pitman, N. J., assignors to Radio Corporation of America, a corporation of Delaware Application January 31, 1950, Serial No. 141,432

8 Claims. (Cl. 154—139)

This invention relates to improvements in moisture-proof membrane materials which are also resistant to salt spray, sunlight, various hydrocarbons, and solvents such as alcohol. More particularly, the invention relates to improved laminated membrane material having an additional surface coating thereon.

The material of the present invention has properties enabling it to be used under extremely rigorous weather and climatic conditions where most materials are useless. The present material can also be used under greatly varying conditions of temperature and humidity under which most materials quickly fail. One example of successful application of the material of the present invention is as a protective membrane for preventing formation of frost on the vibrating element of a microphone.

Many water-repellent materials are not moisture-proof since they have relatively large pores which permit passage of water vapor. Other materials, such as rubber or rubberized cloth, which are substantially completely moisture-proof, have undesirable properties under low temperature conditions, which make them unsuitable for certain uses such as those for which the material of the present invention is particularly adapted. For example, at below-zero temperatures of about −55° C., rubber and rubberized cloth are brittle and also behave acoustically like a drum, when stretched to a taut condition. Also, at all temperatures, rubberized cloth is too heavy for transmitting sound vibrations without exerting a damping effect.

Other water-proof materials, such as wax-impregnated paper, are attacked by fungi, often become tacky in hot weather, and are easily damaged in ordinary usage.

The improved material of the present invention comprises a composite material made up of a very thin sheet of polyethylene fused to a sheet of woven superpolyamide fabric with a coating of a mixture of polyvinyl chloride and acrylonitrile on the exposed surface of the fabric.

One object of the present invention is to provide an improved moisture-proof membrane material.

Another object of the invention is to provide an improved moisture-proof membrane material which is flexible at all temperatures commonly encountered in both cold and hot climates.

Another object of the invention is to provide an improved moisture-proof material which is very light in weight.

Another object of the invention is to provide an improved moisture-proof material which is resistant to salt spray.

Another object of the invention is to provide an improved moisture-proof material which is resistant to abrasion.

Another object of the invention is to provide an improved moisture-proof membrane material which is resistant to attack by oil, grease, and alcohol.

A further object of the invention is to provide an improved moisture-proof membrane material having desirable acoustic properties.

Still another object of the invention is to provide a novel method of making a moisture-proof membrane material.

These and other objects will be more apparent and the invention will be more readily understood from the following description including the drawing, Fig. 1 of which is a cross section view of a preferred embodiment of a membrane material made according to the invention.

Fig. 2 is a perspective view of the article shown in Fig. 1.

*Example*

A sheet of polyethylene 2 having a thickness of 0.001 inch was laminated to one surface of a sheet of superpolyamide fabric 4 having the trade-mark "nylon." The fabric was of taffeta construction with a warp and fill of 100 x 100 mesh. The fabric was 0.0023 inch thick and weighed 12 mg./sq. inch. The threads were 20 denier, 7 filament. The material out of which the preferred fabric was made had a molecular weight of 10,000 to 15,000 as determined by the method described in Journal American Chemical Society, 69, p. 635, 1947. The material had a softening point of about 250° C. The two sheets were laminated by pressing them together at a temperature at which fusion of the polyethylene occurred. This temperature should not exceed 130° C.

The surface 6 of the "nylon" fabric 4 opposite that to which the sheet of polyethylene was fused was then coated with a thin layer 8 of a material comprising 55% polyvinyl chloride and 45% acrylonitrile by weight. This coating was applied by brushing on an 8% by weight solution of the material in volatile solvents which were then permitted to evaporate. In addition to the solids, the solution comprised 12% acetone, 75% methyl ethyl ketone, and 5% cyclohexanone, all percentages being by weight. Care was taken to see that the coating was free of wrinkles and bubbles.

The coated material was dried at room temperature for ½ hour. It was then preheated at 70°–75° C. for 2 hours and then heated at 105° C. for 1 hour, after which it was permitted to cool to room temperature. The heating steps were for the purpose of driving off all solvent which had been used in applying the coating.

Most fabrics other than "nylon" which were tried for use with the material of the present invention were found to have various disadvantages. Only "nylon" was found to have sufficient strength and to have the required resistance to solvents. Although the taffeta construction and the specified mesh are preferred, both can be varied within the spirit of the invention.

Even for the particular acoustic apparatus previously described, the mesh of the cloth may be varied about + or −15%. If the mesh is too open, however, gun blasts will puncture it, while, if too fine a mesh is used, the cloth is too heavy and exerts a damping effect. Where good acoustic properties need not be taken into consideration, the mesh of the cloth is not at all critical. Also, the type of superpolyamide yarn used is not critical.

The polyethylene used was of the film forming type having the trade name "Polythene." It had a softening point of about 100 to 115° C. and may have a molecular weight of about 15,000 to 20,000. Although polyethylene is preferred as the sheet material of the water-proof lamina, polytetrafluoroethylene, in sheet form, may also be used. When polytetrafluoroethylene is laminated to the "nylon" fabric, the pressing temperature should be just above the softening temperature of the fluorinated ethylene polymer.

Although many types of coatings were tried, the combination of polyvinyl chloride and acrylonitrile was found to have the properties preferred for the material of the present invention. It provides a tough coating which is resistant to abrasion, yet is flexible at low temperatures and is water resistant. The main purpose of the coating is to seal the pores of that surface of the fabric which is not joined to the sheet of water-proof material. The preferred thickness of the coating was about 0.3 mil but this is not at all critical unless acoustic properties are to be taken into consideration. In general, the coating should be just thick enough to seal the pores in the fabric without being discontinuous. The strength of the coating solution may be varied but a strength of 5 to 10% by weight of solids is preferred for convenience. The relative percentages of the two ingredients of the coating may be varied by about + or −5. That is, the polyvinyl chlorides may be present in the amount of about 50 to 60% by weight and the acrylonitrile may be present in the amount of about 40 to 50% by weight.

Although the improved material which has been described was found to be particularly useful in acoustical apparatus for protecting a sensitive, sound-vibratable member from the effects of moisture condensation, it will be evident to those skilled in the art that the material has many other practical uses such as water-proof covering, in general.

We claim as our invention:

1. A moisture-proof, membrane material comprising a sheet of woven fabric composed of a superpolyamide to one surface of which is laminated a sheet of water-proof material selected from the class consisting of polyethylene and polytetrafluoroethylene and having another surface sealed with a coating of a material consisting essentially of polyvinyl chloride and acrylonitrile.

2. A material according to claim 1 in which said fabric is of taffeta construction.

3. A material according to claim 2 in which said fabric has a mesh of about 100.

4. A material according to claim 3 in which said sheet of water-proof material is polyethylene.

5. A material according to claim 4 in which said coating material is composed of 55% by weight polyvinyl chloride and 45% by weight acrylonitrile.

6. A method of making a moisture-proof, membrane material comprising laminating to one side of a sheet of woven superpolyamide fabric a thin, flexible sheet of water-proof material selected from the class consisting of polyethylene and polytetrafluoroethylene by pressing said sheets together at a temperature above the softening point of said water-proof material, coating the other exposed surface of the fabric with a solution comprising polyvinyl chloride and acrylonitrile in volatile organic solvents, permitting the coated sheet to dry at room temperature, and then heating at elevated temperature to drive off all residual solvent.

7. A method according to claim 6 in which said water-proof material is polyethylene and the temperature of lamination is above the softening point of said polyethylene but less than 130° C.

8. A method according to claim 6 in which said solution has a strength of between 5 and 10% by weight of solids.

ASHUN YUNG.
WILLIAM P. LOWDEN.

REFERENCES CITED

The following references are of record in the file of this patent:

UNITED STATES PATENTS

| Number | Name | Date |
|---|---|---|
| 2,332,373 | Dorolgh | Oct. 19, 1943 |
| 2,418,904 | Rugeley | Apr. 15, 1947 |
| 2,484,484 | Berry | Oct. 11, 1949 |

FOREIGN PATENTS

| Number | Country | Date |
|---|---|---|
| 491,804 | Great Britain | Sept. 8, 1938 |

OTHER REFERENCES

Plastics, July 1946; pages 32, 34 and 97; published by Edwards Vincent Inc. New York; copy in Patent Office Library.